(12) United States Patent
Elsayed et al.

(10) Patent No.: US 11,678,272 B2
(45) Date of Patent: Jun. 13, 2023

(54) SYSTEM AND METHOD FOR JOINT POWER AND RESOURCE ALLOCATION USING REINFORCEMENT LEARNING

(71) Applicant: University of Ottawa, Ottawa (CA)

(72) Inventors: Medhat Elsayed, Ottawa (CA); Melike Erol-Kantarci, Ottawa (CA)

(*) Notice: Subject to any disclaimer, the term of this patent is extended or adjusted under 35 U.S.C. 154(b) by 239 days.

(21) Appl. No.: 17/085,498

(22) Filed: Oct. 30, 2020

(65) Prior Publication Data

US 2021/0136785 A1     May 6, 2021

Related U.S. Application Data

(60) Provisional application No. 62/928,069, filed on Oct. 30, 2019.

(51) Int. Cl.
| | |
|---|---|
| H04W 72/12 | (2023.01) |
| H04W 52/14 | (2009.01) |
| H04W 72/121 | (2023.01) |
| H04W 72/044 | (2023.01) |
| H04W 72/0446 | (2023.01) |
| H04W 72/53 | (2023.01) |
| H04W 72/50 | (2023.01) |
| G06F 18/21 | (2023.01) |

(52) U.S. Cl.
CPC ..... *H04W 52/143* (2013.01); *H04W 72/0446* (2013.01); *H04W 72/0473* (2013.01); *H04W 72/121* (2013.01); *H04W 72/53* (2023.01); *H04W 72/535* (2023.01); *G06F 18/217* (2023.01)

(58) Field of Classification Search
None
See application file for complete search history.

(56) References Cited

U.S. PATENT DOCUMENTS

| | | | |
|---|---|---|---|
| 2019/0268894 A1* | 8/2019 | Cho | H04W 72/048 |
| 2020/0104184 A1* | 4/2020 | Subramanian | G06N 3/08 |
| 2020/0178093 A1* | 6/2020 | Peng | H04W 88/10 |
| 2020/0195506 A1* | 6/2020 | Peng | H04L 41/0816 |
| 2021/0136785 A1* | 5/2021 | Elsayed | H04W 72/1257 |
| 2021/0153069 A1* | 5/2021 | De Domenico | H04W 24/02 |
| 2022/0141821 A1* | 5/2022 | D'Oro | H04L 41/5019 455/452.1 |

FOREIGN PATENT DOCUMENTS

EP     3474619 A1 *    4/2019       H04W 72/04

OTHER PUBLICATIONS

ITU, "Setting the Scene for 5G: Opportunities and Challenges", 2018, International Telecommunication Union, Switzerland, Geneva. 56 Pages.

(Continued)

*Primary Examiner* — Kodzovi Acolatse
(74) *Attorney, Agent, or Firm* — Brion Raffoul

(57) ABSTRACT

Systems and methods for joint power and resource allocation on a shared 5G channel. The method selects one of a group of grouped actions and implements this selected group of actions. The effects of the actions on the environment and/or the users are then assessed. Based on the result, a reward is allocated for the system. Multiple iterations are then executed with a view to maximizing the reward. Each of the grouped actions comprises joint power and resource allocation actions.

15 Claims, 3 Drawing Sheets

(56) References Cited

OTHER PUBLICATIONS

Soret, B., et al. "Fundamental Tradeoffs among Reliability, Latency and Throughput in Cellular Networks" Dec. 2014, IEEE Globecom Workshops. 6 Pages.

Pocovi, G., et al."Joint Link Adaptation and Scheduling for 5G Ultra-Reliable Low-Latency Communications" 2018, vol. 6, IEEE Access. 11 Pages.

Comsa, I., et al. "Towards 5G: A Reinforcement Learning-Based Scheduling Solution for Data Traffic Management" Dec. 2018, vol. 15, No. 14. IEEE Transactions on Network and Service Management. 15 Pages.

Esswie, A. A., et al. "Null Space Based Preemptive Scheduling For Joint URLLC and eMBB Traffic in 5G Networks" 2018. IEEE Explore. 6 Pages.

Alsenwi, M., et al. "eMBB-URLLC Resource Slicing: A Risk-Sensitive Approach" vol. 23, No. 4, Apr. 2019. IEEE Communications Letters. 4 Pages.

Samarakoon, S., et al. "Federated Learning for Ultra-Reliable Low-Latency V2V Communications" 2018. IEEE Xplore. 7 Pages.

Esswie, A. A. "Multi-User Preemptive Scheduling For Critical Low Latency Communications in 5G Networks" 2018 IEEE Symposium on Computers and Communications. 6 Pages.

Anand, Arjun., et al. "Joint Scheduling of URLLC and eMBB Traffic in 5G Wireless Networks" IEEE Conference on Computer Communications, 2018, IEEE INFOCOM 2018, 9 Pages.

"5G; NR; Physical layer procedures for data" 3GPP TS 38.214, Version 15.3.0 Release 15. ETSI. 99 Pages.

Pocovi, G., et al. "MAC Layer Enhancements for Ultra-Reliable Low-Latency Communications in Cellular Networks" 2017, WT02—3rd International Workshop on 5G RAN Design, 6 Pages.

"LTE; Evolved Universal Terrestrial Radio Access (E-UTRA); Radio Frequency (RF) requirements for LTE Pico Node B" 3GPP TR 36.931, Version 12.0.0 Release 12. ETSI. 29 Pages.

"LTE; Evolved Universal Terrestrial Radio Access (E-UTRA); Base Station (BS) radio transmission and reception" 3GPP TS 36.104 version 12.5.0 Release 12. ETSI. 154 Pages.

Elsayed, M., et al. "AI-Enabled Radio Resource Allocation in 5G for URLLC and eMBB Users" 2019, IEEE Xplore. 6 Pages.

\* cited by examiner

SYSTEM AND METHOD FOR JOINT POWER AND RESOURCE ALLOCATION USING REINFORCEMENT LEARNING

RELATED APPLICATIONS

This application is a non-provisional patent application which claims the benefit of U.S. provisional application No. 62/928,069 filed on Oct. 30, 2019.

TECHNICAL FIELD

The present invention relates to wireless broadband networks. More specifically, the present invention relates to systems and devices for balancing the needs of users of different categories of service on a shared 5G channel.

BACKGROUND

Next-generation wireless networks will be serving a large number of heterogeneous services that exhibit diverse quality of service requirements, and those come from many use cases and verticals. The recent 5G New Radio (5G-NR) standard introduced three service categories: Ultra-Reliable Low-Latency (URLLC), enhanced Mobile Broad Band (eMBB), and massive Machine-Type Communication (mMTC). Each service category exhibits special quality of service requirements which implies several trade-offs when considering resource management. Such network diversification and densification leads to more challenging resource allocation problems than the previous generation, i.e., Long Term Evolution (LTE). A dwelling problem in the literature is the co-existence of URLLC and eMBB users. The traffic of URLLC users is sparse and has short packet size, whereas their latency requirement mandates rapid scheduling decisions. Indeed, latency and reliability of URLLC traffic is tangled. Improving reliability, in some cases, can lead to higher latency. For instance, to achieve high reliability, Hybrid Automatic Repeat Request (HARM) re-transmissions with link adaptation is used in 5G. Thus, multiple re-transmissions increase latency. On the other hand, addressing latency enhancements can lead to higher packet drop rates.

Recently, scheduling of URLLC and eMBB traffic has been studied in several works with respect to the above-mentioned tradeoffs. In one work, the authors aim to prioritize URLLC traffic by introducing several mechanisms which include allocating mini-slots as the URLLC traffic arrives as well as several modifications to re-transmission mechanisms (see G. Pocovi, K. I. Pedersen and P. Mogensen, "Joint Link Adaptation and Scheduling for 5G Ultra-Reliable Low-Latency Communications," in IEEE Access, vol. 6, pp. 28912-28922, 2018, doi: 10.1109/ACCESS.2018.28385, hereinafter Pocovi, the entirety of which is herein incorporated by reference). Meanwhile, in another work, a learning approach is used for latency and packet drop rate minimization (see I. Comşa et al., "Towards 5G: A Reinforcement Learning-Based Scheduling Solution for Data Traffic Management," in IEEE Transactions on Network and Service Management, vol. 15, no. 4, pp. 1661-1675, December 2018, doi: 10.1109/TNSM.2018.2863563, hereinafter Comşa, the entirety of which is herein incorporated by reference). This approach aims at learning the best scheduling rule, such as fairness, at every iteration.

However, despite the approaches considered in Pocovi and Comşa, it remains necessary to develop a more robust method for balancing the key performance indicators of heterogeneous services.

SUMMARY

The present invention provides systems and methods for joint power and resource allocation on a shared 5G channel. The method selects one of a group of grouped actions and implements this selected group of actions. The effects of the actions on the environment and/or the users are then assessed. Based on the result, a reward is allocated for the system. Multiple iterations are then executed with a view to maximizing the reward. Each of the grouped actions comprises joint power and resource allocation actions.

In a first aspect, this document describes a method for managing resources for a shared channel being shared between users of different service categories, the method comprising:
  (a) providing at least one software agent;
  (b) causing said at least one software agent to select one action group to be executed for at least one user from a service category;
  (c) executing said action group for said at least one user from said service category;
  (d) assessing at least one effect of said action group on a measurable metric affecting said at least one user;
  (e) determining a reward result based on said at least one effect of said action group;
  (f) repeating steps (b)-(e) to thereby maximize said reward result over multiple iterations of steps (b)-(e);
  wherein
  said one action group is selected from a predetermined group of action groups, each of said action groups including actions that relate to power allocations and to resource block allocation such that execution of each action group result in joint power and resource block allocations for a given scheduled interval.

In another aspect, this document describes a method for managing resources for a shared wireless channel being shared between users that are classified under different service categories, the method comprising:
  (a) providing at least one software agent;
  (b) causing said at least one software agent to select one action group to be executed for at least one user from a service category;
  (c) executing said action group for said at least one user from said service category;
  (d) assessing at least one effect of said action group on a measurable metric affecting said at least one user;
  (e) determining a reward result based on said at least one effect of said action group;
  (f) repeating steps (b)-(e) to thereby maximize said reward result over multiple iterations of steps (b)-(e);
  wherein
  said one action group is selected from a predetermined group of action groups, each of said action groups including actions that relate to at least one of: power allocations and resource block allocations.

In a yet further aspect, this document describes a system for managing resources for a shared channel, said shared channel being shared between users that are classified under different service categories, the system comprising:
  a link adaptation module for allocating resources to modules processing packets for multiple users, each of said multiple users being classified under different categories and for determining at least one measurable metric for said shared channel;
  a scheduler module receiving said at least one measurable metric from said link adaptation module;

wherein said scheduler module executes a method comprising:
causing at least one software agent to select one action group to be executed for at least one user from one of said different service categories;
executing said action group for said at least one user from said service category to thereby allocate resources to said modules by way of said link adaptation module;
assessing at least one effect of said action group on said at least one measurable metric affecting said at least one user;
determining a reward result based on said at least one effect of said action group; and
repeating said method to thereby maximize said reward result over multiple iterations of said method;
wherein
said one action group is selected from a predetermined group of action groups, each of said action groups including actions that relate to at least one of: power allocations and resource block allocations.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect of the present invention, the coexistence problem of URLLC and eMBB traffic over 5G-NR network is addressed. The approach seeks to balance URLLC users' latency and reliability by designing a multi-agent Q-learning algorithm for joint power and resource allocation. One aspect of the present invention utilizes the flexibility of the time-frequency grid introduced in the 5G-NR standard to allocate resources to users according to their demands. In particular, the multi-agent Q-learning method of the present invention is adopted for each general eNodeB (gNB) to perform joint power and resource block allocation every scheduling interval. Improving latency requires reducing both transmission and queuing delays since they constitute the main impairments against achieving the 1 msec latency requirement. Furthermore, improving reliability contributes to improving transmission delay by reducing both the need for re-transmission and packet's segmentation at the RLC layer. In addition, queuing delay is a direct outcome of scheduling delay. As such, the present invention uses a reward function crafted carefully to address reliability, transmission and queuing delays of URLLC users.

The present invention's performance was evaluated in the presence of Constant Bit Rate (CBR) traffic, in addition to Poisson traffic. The present invention outperforms the baseline algorithm presented in Pocovi with a 4% reduction in Packet Drop Rate (PDR), an approximately 1 millisecond reduction in URLLC users' latency at the $10^{-4}$ percentile, and a 16-fold increase in eMBB users' throughput for high traffic loads (e.g., loads of 2 Mbps).

Figure 1:
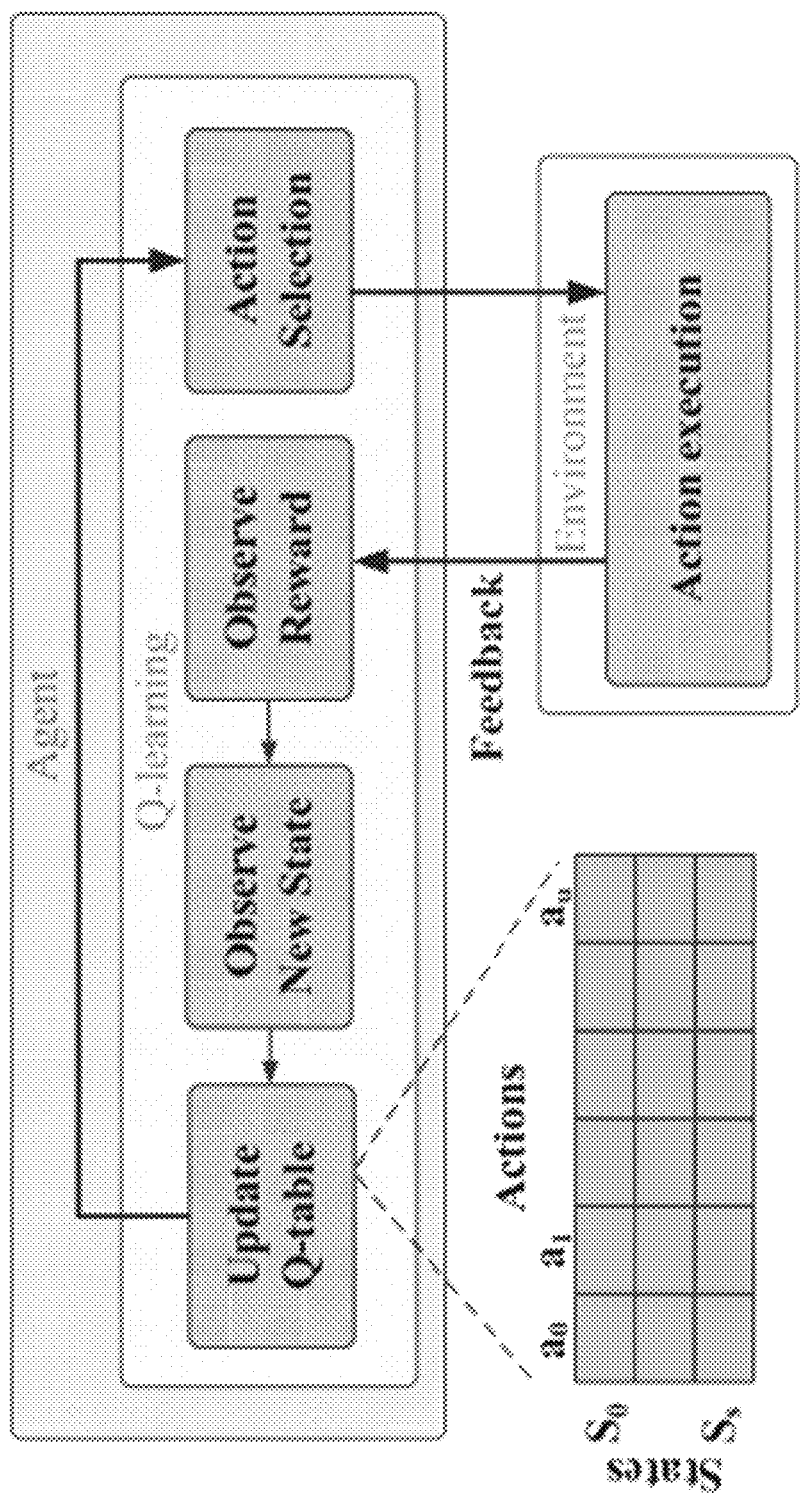
FIG. 1 is a block diagram schematically illustrating one aspect of the present invention.

In the present invention's decentralized learning approach, each gNB adopts the multi-agent reinforcement learning, specifically Q-learning algorithm. Q-learning is defined by the tuples: Agents, states, actions, reward, policy, and Q-value. FIG. 1 presents a general block diagram of the operation of Q-learning framework. Agents are the set of players aiming to select actions to maximize their reward. The agents do not share information regarding their action selection to avoid excessive overhead. However, feedback from the environment acts as a clue to each agent. Hence, states are used to observe the status of the environment. In addition, a reward function is defined to guide each agent in its decision process. In particular, each agent's objective is to find the best policy that maximizes its discounted reward over infinite time-horizon. As such, Q-learning estimates the quality of visited state-action pair using an iterative update as follows in equation (A):

$$Q^{new}(s^{(t)}, a^{(t)}) \leftarrow (1-\alpha) \cdot Q(s^{(t)}, a^{(t)}) + \alpha \cdot \left[ r^{(t)} + \gamma \cdot \max_a Q^{old}(s^{(t+1)}, a) \right], \quad (A)$$

In the above, $Q^{new}(s^{(t)}, a^{(t)})$ is the quality value, i.e. Q-value, of state-action pair $(s^{(t)}, a^{(t)})$ at $t^{th}$ iteration, $\alpha$ is the learning rate, $\gamma$ is the discount factor, and $r^{(t)}$ is the instantaneous reward. The Q-values are stored in a table indexed by the states and actions. The steps of Q-learning are shown in FIG. 1.

In FIG. 1, the method starts with the agent selecting an action to be executed, then the agent observes some reward corresponding to that action. This action will lead to the environment's state transition. Finally, the method updates the Q-value using the above eq. (A) and repeats the process.

The above noted Q-learning method was formulated to improve reliability and minimize latency of URLLC users. The explanations for the method components are as follows:
1) Agents: gNBs.
2) Actions: The actions are defined as the joint power and resource block allocations taken by each gNB for its attached users. To reduce action-space, consecutive resource blocks are bundled to form a RBG (resource block group) which represents 8 consecutive resource blocks. The number of RBGs available for each gNB is denoted with K. As such, actions of $j^{th}$ gNB on $k^{th}$ RBG can be defined as $a_{k,j}=\{d_{k,j}, p_{k,j}\}$, where $d_{k,j}=\{d_{k,i,j}: i \in U\}$ is a vector of RBG's allocation indicator for each user, i.e. $d_{k,i,j}=1$ if $k^{th}$ RBG is allocated to $i^{th}$ user and 0 otherwise, and $p_{k,j}$ is the power allocated to $k^{th}$ RBG. Of course, instead of joint power and resource block allocations, individual power allocations or individual resource block allocations may be used as the actions.
3) States: In the absence of cooperation between the agents, feedback from the environment plays this role which is represented by the states. In particular, the interference impacting URLLC users is observed/assessed by estimating the SINR (signal to interference plus noise ratio) value for each user. This SINR quantifies the reliability for URLLC users. As such, two states are designed as follows in Eqn. (B):

$$S_{k,j} = \begin{cases} S_0 & \tilde{\gamma}_{k,j} \geq \gamma_{th}, \\ S_1 & \text{Otherwise}, \end{cases} \quad (B)$$

In the above, $\tilde{\gamma}_{k,j}$ represents the average SINR value of URLLC users of $j^{th}$ cell and $k^{th}$ RBG. State $S_0$ is visited whenever the average SINR of URLLC users exceeds a certain threshold, $\gamma_{th}$, while $S_1$ is visited otherwise. The value $\gamma_{th}$ is chosen to maintain a high probability of decoding. Furthermore, SINR contributes to link adaptation which improves transmission delay.

4) Reward: The reward function for this aspect of the invention is as follows in Eqn. (C):

$$R_{k,j} = \begin{cases} 1 - \max_{i \in urllc}(Q_{i,j})^2 & \overline{\gamma}_{k,j} \geq \gamma_{th}, \\ -1 & \text{otherwise}, \end{cases} \quad (C)$$

In the above, $Q_{i,j}$ represents the last packet queuing delay of the $i^{th}$ URLLC user. The advantage of formulating the reward as in Eqn. (C) is twofold. First, the reward serves to drive each agent toward actions with better average SINR for URLLC users, i.e. high reliability. On one hand, improving reliability should improve transmission delay since less re-transmissions will be required. On the other hand, packets can be accommodated in larger transport blocks. Second, the agent is rewarded a value that relies on the maximum queuing delay experienced by its attached URLLC users. In particular, as the maximum delay approaches zero, the reward value approaches one. This motivates each agent to schedule URLLC users immediately, i.e. zero queuing delay, as this will lead to the highest reward value.

This aspect of the present invention uses a Q-learning-based joint power and resource allocation technique that improves latency and reliability of URLLC users in 5G. The method of the present invention was crafted to address the main bottlenecks toward achieving high reliability and low latency. In particular, the reward and the states were formulated to improve inter-cell interference for reliability and transmission delay, on one hand, and improve the queuing delay, on the other hand. When the method of the present invention is compared to a modified proportional fairness algorithm that gives higher allocation priority to URLLC over eMBB users, the present invention outperforms the baseline algorithm in terms of both reliability and latency of URLLC users while achieving higher throughput for eMBB users.

In another aspect of the present invention, addressed is the coexistence of URLLC and eMBB traffic over a 5G-NR network. This aspect of the invention seeks to simultaneously balance QoS demands of both types of traffic. In particular, besides improving latency and reliability of URLLC users, the aim is to maintain throughput performance of eMBB users. To achieve this, a multi-agent Q-learning method, namely Latency-Reliability-Throughput Improvement in 5G NR using Q-Learning (LRT-Q), to perform joint power and resource block allocation for each general Node-B (gNB) at every scheduling interval. The reward and state functions of LRT-Q is designed carefully to satisfy three key performance indicators (KPIs); i.e. reliability, queuing, and transmission delays of URLLC users, and throughput of eMBB users. When the performance of the LRT-Q method is evaluated in the presence of Constant Bit Rate (CBR) traffic, in addition to Poisson traffic, improvements were noted. The performance of LRT-Q was compared to two baseline algorithms: A priority-based proportional fairness algorithm (with addition of equal power allocation) and a Q-learning-based algorithm designed to improve KPIs of URLLC solely. Simulation results show 29% and a 21-foldincrease in eMBB users' throughput compared to LR-Q and PPF, respectively, at high traffic load of URLLC, i.e. 2 Mbps. This causes less than 0.5 ms degradation in URLLC users' latency at the $10^{-4}$ percentile compared to both LR-Q and PPF.

In this aspect of the invention, the method is based on decentralized reinforcement learning, where each gNB acts as an agent running a Q-learning algorithm to perform resource allocation. The mathematical formulation of Q-learning relies on Markov Decision Processes (MDP) and is defined by, much like the aspect explained above, agents, states, actions, reward function and a policy. The operation of Q-learning relies on interaction with the environment and learning from trial and error-based rewards being given to accepted or favored actions. More specifically, an agent selects an action, executes it, and receives a reward that reflects the quality of the selected action. This process is repeated until the agent reaches a policy of action selection that maximizes its total discounted reward. Q-learning estimates the quality of the visited state-action pair using an iterative update as presented in equation (A) above.

In LRT-Q, actions are the joint power and resource block allocations performed by agents, i.e., gNBs. To keep the Q-table size manageable, 8 consecutive resource blocks are grouped into an RBG (resource block group) and the agent allocates RBGs. Of course, other numbers of resource blocks may be used and/or grouped into an RBG. In LRT-Q, states are driven by observations from the environment which reflect the impact of actions of other agents. In particular, interference among users represents the major bottleneck against achieving better latency, reliability, and throughput. As such, states are defined to capture the average SINR achieved by users attached to each gNB as follows:

$$S_{k,j} = \begin{cases} S_0 & \overline{\gamma}_{k,j} \geq \gamma_{th}, \\ S_1 & \text{Otherwise}, \end{cases}$$

In the above, $\overline{\gamma}_{k,j}$ represents the average estimate of the SINR value of the $k^{th}$ RBG and defined as $\overline{\gamma}_{k,j} = \beta \overline{\gamma}_{k,j}^U + (1-\beta) \overline{\gamma}_{k,j}^E$ where $\overline{\gamma}_{k,j}^U$ is the average SINR of URLLC users, $\overline{\gamma}_{k,j}^E$ is the average SINR of eMBB users, and $\beta$ is a factor controlling the priority given to URLLC and eMBB users. $\gamma_{th}$ is a threshold SINR value. The value $\gamma_{th}$ is chosen to maintain high probability of successful decoding. Finally, the reward function is formulated to reward actions that achieve the objectives of the method of the present invention. This reward function is defined as (Eqns. (D,E,F)):

$$\rho_{k,j}^U = \begin{cases} 1 - \max(T_{i,j}^q)^2 & \overline{\gamma}_{k,j}^U \geq \gamma_{th}, \\ -1 & \text{otherwise}, \end{cases} \quad (D)$$

$$\rho_{k,j}^E = \frac{2}{\pi} \tan^{-1}(\overline{C}_{k,j}^E), \quad (E)$$

$$\rho_{k,j} = \beta \rho_{k,j}^U + (1-\beta) \rho_{k,j}^E, \quad (F)$$

In the above function, $\rho_{k,j}^U$ is the reward of URLLC users on the $k^{th}$ RBG, $\rho_{k,j}^E$ is the reward of eMBB users, and $\rho_{k,j}$ is the total reward of the $j^{th}$ gNB. $T_{i,j}^q$ represents the last packet queuing delay of the $i^{th}$ URLLC user ($i \in U$), and $\overline{C}_{k,j}^E$ is the average throughput of eMBB users. Eqn. (F) serves to address the KPIs of both URLLC and eMBB users through adjustment of parameter $\beta$. In particular, Eqn. (D) aims at improving latency and reliability of URLLC users where the agent is rewarded a value relative to the queuing delay as long as its reliability is meeting a certain threshold, i.e. SINR threshold. Indeed, the reward value relies on the maximum queuing delay experienced by URLLC users. This means that the method will aim to improve the worst queuing delay. In addition, achieving better average SINR significantly contributes to the overall latency since better SINR leads to less packet segmentation and reduced transmission delay. Overall, Eqn. (D) motivates the MAC scheduler to immediately allocate URLLC users to better RBGs, i.e. hence achieving low-latency and high reliability at the same time.

Eqn. (E) serves to improve the throughput of eMBB users, where increased throughput leads to a reward value close to one. Using the parameter β in Eqn. (F), the balance between the conflicting KPIs is obtained.

This aspect of the present invention shows the trade-off among the key performance indicators (KPIs) of ultra-reliable and low-latency communications (URLLC) and enhanced Mobile Broadband (eMBB) users. The method of this aspect of the invention is a Q-learning based joint power and resource allocation method that aims at improving both latency and reliability of URLLC users as well as throughput of eMBB users. When compared to two algorithms, simulation results revealed that this aspect of the present invention achieved a significant performance gain in eMBB's throughput, for example, 29% and 21%, when compared to the baseline algorithms, while simultaneously incurring a slight degradation in latency for URLLC users, e.g., less than 0.5 msec at the $10^{-4}$ percentile. In addition, a PDR of 0.06% was achieved, which is identical to PDR achieved using the method in the first aspect of the invention.

Regarding the implementation of the two aspects of the invention as noted above, FIG. 2 illustrates a system 10 that can implement the various methods noted above. As can be seen, packets 20 arrive into the various buffers 30. The buffers 30 feed the multiplexer 40 and the multiplexer feeds the various modules 50-70 prior to having the scheduled packets fed to the blocks that concatenate the transport blocks 80 and, subsequently, to the block that performs RF processing and transmission 90. It should be clear that the system uses a scheduler block 100 that receives the SNIR from the link. Based on the SNIR, power and resource allocation parameters are sent to the link adaptation module 110. The link adaptation module 110 then adjusts the parameters for the various modules 50-70 to adjust the power and resource allocation for the link. The various modules 50-70 can each service packets for users classified for different service categories. Thus, each module 50-70 will have its power and/or resources allocated by the link adaptation module 110 based on the decision of the scheduler 100. The scheduler 100 determines, using one or both of the methods described above, which and how much resources to allocate to packets for the different service categories based on the link quality (SINR) received from the link adaptation module 110. Once the modules 50-70 have had their relevant resources allocated, the packets passing through these modules are then sent to their destination using the blocks 80, 90.

Figure 2:
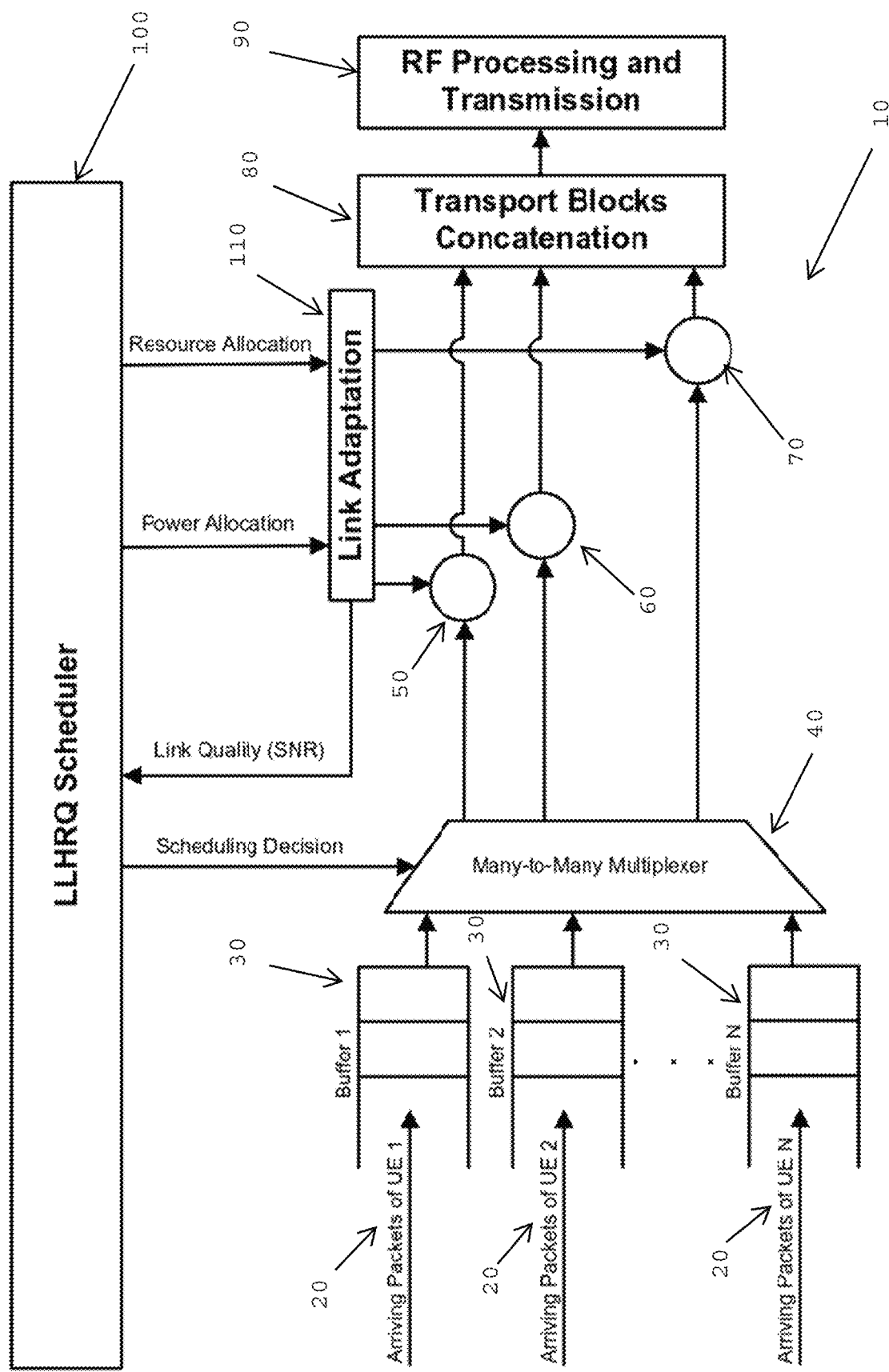
FIG. 2 is a block diagram of a system for implementing the various aspects of the present invention.

For the system in FIG. 2, it can be seen that the packets belong to or are associated with users that are classified under different service categories. In the example given above, user may be classified as an URLLC user or an eMBB user. Thus, the packets are treated differently by the modules 50-70 based on their classification in terms of service category. The system implements the method explained above and the effects of the action group implemented are determined using the SINR for the affected users/packets.

It should be clear that the system in FIG. 2 can implement the two methods above. The scheduler can implement multiple agents that operate using one if not both of the methods noted above.

Figure 3:
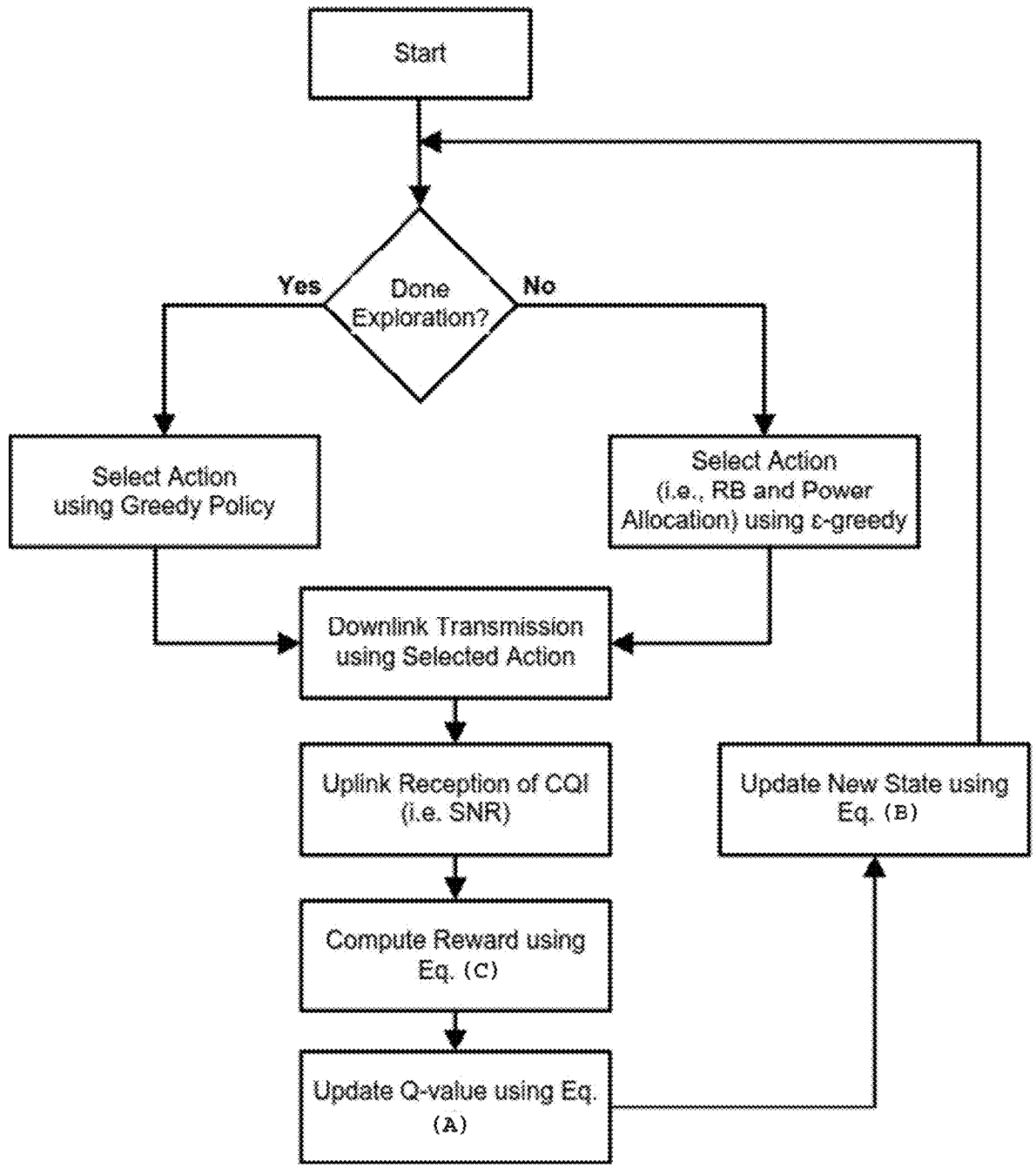
FIG. 3 is a flowchart detailing the steps in another aspect of the present invention.

The methods noted above can be summarized in the flowchart in FIG. 3. As can be seen, the process is performed for a certain exploration time, after which the method applies a greedy policy. During exploration time, actions are selected using epsilon-greedy policy, in which actions are either selected randomly with epsilon probability or selected according to the greedy policy with (1-epsilon) probability. If exploration is completed, actions are always selected according to the greedy policy. Once the action is completed, the transmission is completed with the selected action. The uplink reception of the SNIR is then completed and the reward based on the selected action is calculated. Afterwards, the Q-value is calculated, and the new state is calculated and updated. The method then loops back to the start of the process. This method can, of course, be implemented by multiple agents in parallel.

It should be clear that the various aspects of the present invention may be implemented as software modules in an overall software system. As such, the present invention may thus take the form of computer executable instructions that, when executed, implement various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM), or similar computer software storage media known in the art may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk), or transmittable to a computer system via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for managing resources for a shared channel being shared between users that are classified under different service categories, the method comprising:
   (a) providing at least one software agent in a gNodeB;
   (b) causing said at least one software agent to select one action group to be executed for at least one user from a service category;
   (c) executing said action group for said at least one user from said service category;
   (d) assessing at least one effect of said action group on a measurable metric affecting said at least one user;
   (e) determining a reward result based on said at least one effect of said action group;
   (f) repeating steps (b)-(e) to thereby maximize said reward result over multiple iterations of steps (b)-(e);
   wherein said one action group is selected from a predetermined group of action groups, each of said action groups including actions that relate to at least one of: power allocations and resource block allocations;
   said at least one software agent comprises a plurality of software agents; there is an absence of cooperation between said plurality of software agents; and said absence of cooperation between said plurality of software agents is such that action group selections are not communicated between each of said plurality of software agents.

2. The method according to claim 1, wherein said shared channel is a 5G channel.

3. The method according to claim 2, wherein said service category is Ultra-Reliable Low-Latency (URLLC).

4. The method according to claim 2, wherein said service category is enhanced Mobile Broadband (eMBB).

5. The method according to claim 1, wherein each of said software agents observes a state of said shared channel to execute step d).

6. The method according to claim 5, wherein said state is based on a signal to interference plus noise ratio value for said at least one user.

7. The method according to claim 5, wherein said state is based on an average estimate of a signal to interference plus noise ratio value users classified under a specific category.

8. The method according to claim 1, wherein execution of each action group results in joint power and resource block allocations for a given scheduled interval.

9. The method according to claim 1, wherein execution of each action group results in power allocations for a given scheduled interval.

10. The method according to claim 1, wherein execution of each action group results in resource block allocations for a given scheduled interval.

11. The method according to claim 1, wherein said measurable metric is at least one of: user latency, reliability, transmission delay, queueing delay, and scheduling delay.

12. The method according to claim 1, wherein said reward result is based on a packet queueing delay for said at least one user.

13. The method according to claim 1, wherein said reward result is based on an average throughput for users classified under a specific category.

14. The method according to claim 1, wherein said reward result is based on a packet queueing delay for said at least one user classified under a first specific category and on an average throughput for users classified under a second specific category.

15. A system for managing resources for a shared channel, said shared channel being shared between users that are classified under different service categories, the system comprising a processor configured to execute:
   a link adaptation module for allocating resources to modules processing packets for multiple users, each of said multiple users being classified under different categories and for determining at least one measurable metric for said shared channel;
   a scheduler module receiving said at least one measurable metric from said link adaptation module; wherein said scheduler module executes a method comprising:
   causing at least one software agent to select one action group to be executed for at least one user from one of said different service categories;
   executing said action group for said at least one user from said service category to thereby allocate resources to said modules by way of said link adaptation module;
   assessing at least one effect of said action group on said at least one measurable metric affecting said at least one user;
   determining a reward result based on said at least one effect of said action group;
   repeating said method to thereby maximize said reward result over multiple iterations of said method;
   wherein said one action group is selected from a predetermined group of action groups, each of said action groups including actions that relate to at least one of: power allocations and resource block allocations;
   said at least one software agent comprises a plurality of software agents; there is an absence of cooperation between said plurality of software agents; and said absence of cooperation between said plurality of software agents is such that action group selections are not communicated between each of said plurality of software agents.

* * * * *